Oct. 9, 1934.   E. PIQUEREZ   1,976,632
APPARATUS FOR TESTING THE BRAKES OF VEHICLES
Filed April 12, 1932   3 Sheets-Sheet 1

INVENTOR
EMILE PIQUEREZ
BY
ATTORNEY

Oct. 9, 1934.   E. PIQUEREZ   1,976,632
APPARATUS FOR TESTING THE BRAKES OF VEHICLES
Filed April 12, 1932   3 Sheets-Sheet 2

INVENTOR
EMILE PIQUEREZ
BY
ATTORNEY

Oct. 9, 1934.   E. PIQUEREZ   1,976,632
APPARATUS FOR TESTING THE BRAKES OF VEHICLES
Filed April 12, 1932   3 Sheets-Sheet 3

INVENTOR
EMILE PIQUEREZ
BY
ATTORNEY

Patented Oct. 9, 1934

1,976,632

UNITED STATES PATENT OFFICE 1,976,632

APPARATUS FOR TESTING THE BRAKES OF VEHICLES

Emile Piquerez, Paris, France, assignor to Tecalemit Limited, Brentford, England, a British company Application April 12, 1932, Serial No. 604,711 In France April 13, 1931

5 Claims. (Cl. 73—51)

An application has been filed in France, the 13th April 1931.

In the specification of patent application Serial No. 473,670, filed August 7, 1930, there is described an apparatus giving, by direct reading, the value of the ratio $$K=\frac{F}{P}$$

of the braking effort at the rim to the weight supported by the wheel. In order to obtain that measurement, the wheel is mounted on a carriage rolling on ramps of variable slope. After the application of the brakes, a horizontal traction is exerted on the axle of the wheel, which transmits that effort to the carriage. The measurement of the coefficient K results from the determination of the slope of the ramps at the moment when the effort necessary to cause the carriage to move is equal to the braking effort and, consequently, at the moment when, the wheel commencing to turn, the carriage, remains in position.

In the above described apparatus, it is not possible to drive the wheel with a continuous movement, and the measurement made of the braking effort corresponds to the co-efficient of friction at the stopping of the brake lining on its drum.

The object of the present invention is to remedy this inconvenience, by constructing the apparatus in such a manner as to effect the measurement when the wheel turns with a continuous movement.

Figure 1:
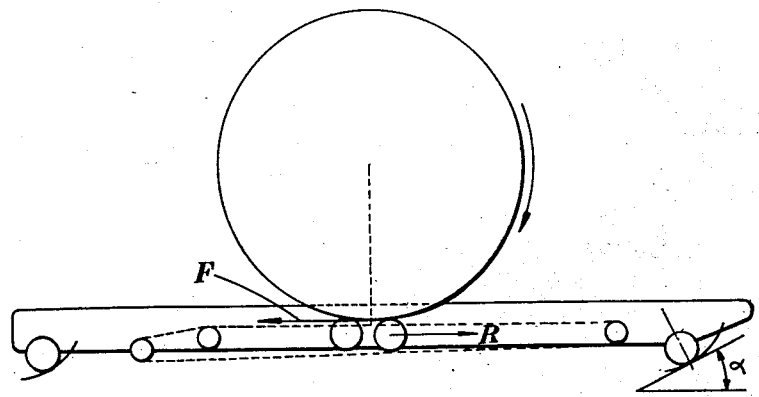
Figs. 1 to 3 are diagrammatic views showing the various forces and their angles of application. Only the elements of the structure which are necessary to show these forces and angles are shown therein.

To that end, as shown in the diagram in Fig. 1 of the annexed drawings, according to the present invention each carriage is provided with a device operated mechanically and exercising at the rim of the wheel a continuous effort (F, Fig. 1) causing the wheel to turn in spite of the action of the brake. The said device, which forms part of the carriage, is arranged in such a manner that the reaction opposed by the wheel is exercised horizontally and gives rise to a force R tending to drive the carriage in a reverse direction to the movement of the wheel.

The carriage will take up a position of equilibrium on its ramps at a point of which the inclination is α, and the equation of equilibrium will be the same as in the device of the above-mentioned application No. 473,670, namely $$F=(P+\omega) \tan \alpha \quad (1)$$

F being the reaction of the wheel on the carriage; that is to say, the braking effort at the rim, P the weight supported by the wheel, ω the weight of the carriage itself.

From that equation there is drawn in said application No. 473,670 the relation $$K=\frac{F}{P}=\tan \alpha+\frac{\omega}{P}\tan \alpha$$

The present invention in the second place provides a method of eliminating the corrective term variable with the weight of the vehicle, $$\frac{\omega}{P}\tan \alpha,$$

a method which consists in exerting on the carriage, by any suitable means, a horizontal effort $f=\omega \tan \alpha$, for example, by means of a counterweight or the equivalent. The equation of equilibrium then becomes $$F+f=F+\omega \tan \alpha=(P+\omega) \tan \alpha$$

from which immediately results:

$$K=\frac{F}{P}=\tan \alpha$$

As in said application No. 473,670, K is given by an index displaced on a plate in relation to the movement of the carriage considered.

Figure 2:
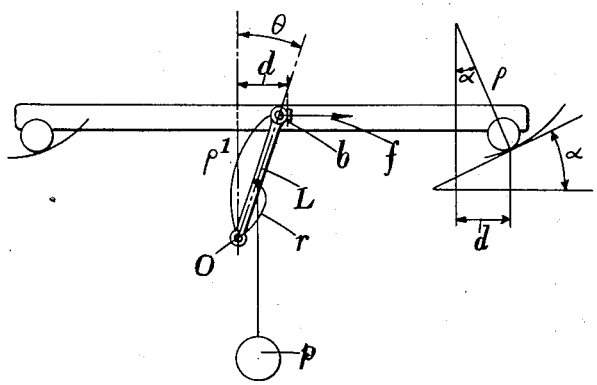

The diagram shown in Figure 2 shows means for carrying out the above method. A lever L articulated at O, carries a weight P at a distance from $O=r$. This lever presses on a stop $b$ of the carriage at a distance from $O=\rho'$.

The action of the lever is figured by the force $f$.

When the carriage is immovable, we have $f\rho' \cos \theta = pr \sin \theta$, from which:

$$f=\frac{pr}{\rho'} \tan \theta;$$

to constantly have $f=\omega \tan \alpha$, it is sufficient to determine $p, r, \rho'$ and $\theta$ in such a manner that one may have the identity:

$$p\frac{r}{\rho'} \tan \theta = \omega \tan \alpha$$

As the linear displacement $d$ of the stop $b$ and of the roller are equal, if by construction one makes $\rho'=\rho$ (radius of the ramps) we have $\theta=\alpha$, and in consequence $$p\frac{r}{\rho}=\omega$$

from which the value of the counterpoise:

$$p=\frac{\omega\rho}{r}$$

Figure 3:
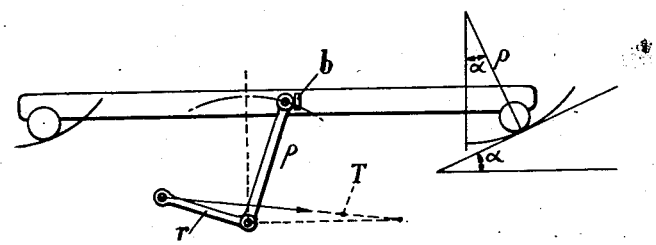

Figure 3 shows, diagrammatically, an approximate solution which consists in causing to act on each carriage in movement, through the intermediary of an oscillating lever provided with two arms at right angles to each other, a spring T whose initial tension is equal to $$\frac{\omega\rho}{r}$$

$\omega$ and $r$ being the arms of the lever, and being equal to the radius of the ramp, as previously described.

At rest, the line of action of the spring passes through the point of articulation of the lever and there is no action on the carriage.

If T were constant and horizontal the conditions would be the same as in the preceding construction. In practice T decreases slightly but the equilibrium can be considered as sufficient.

Figure 4:
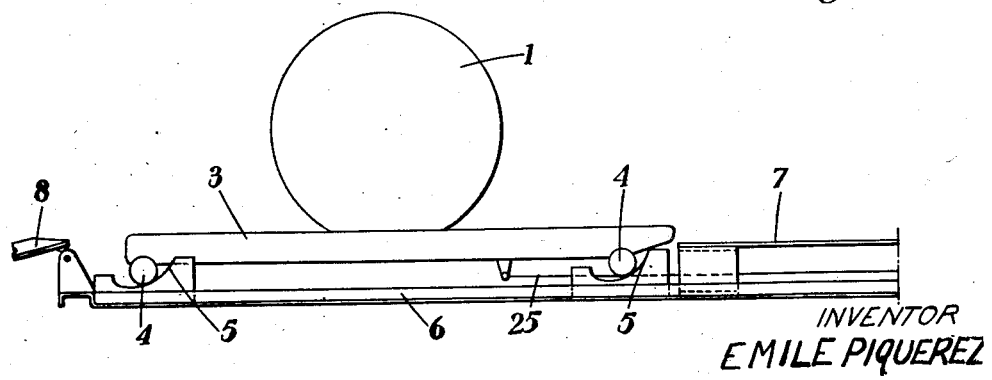
Figs. 4 to 6 are views of the actual structure of the device.
Figure 5:
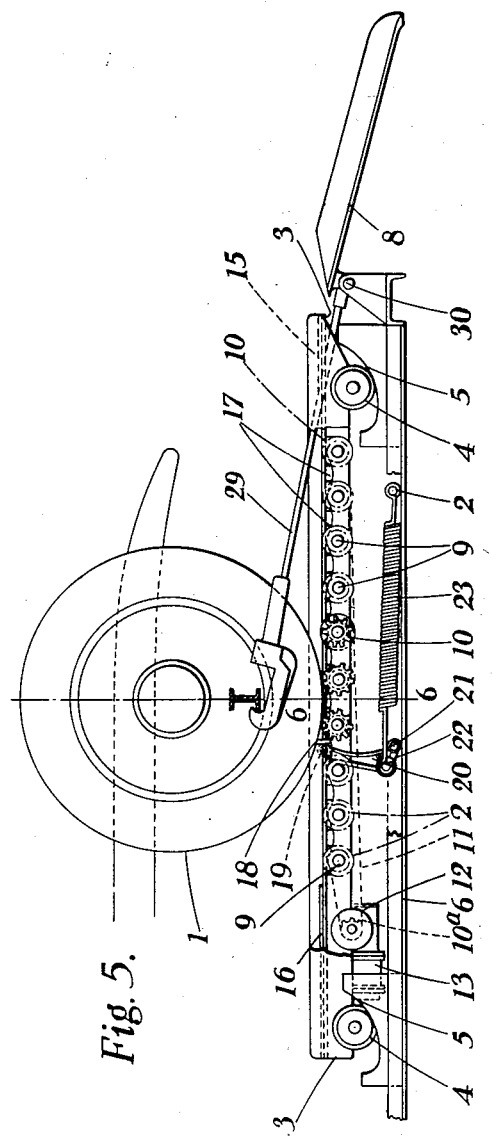
Figure 6:
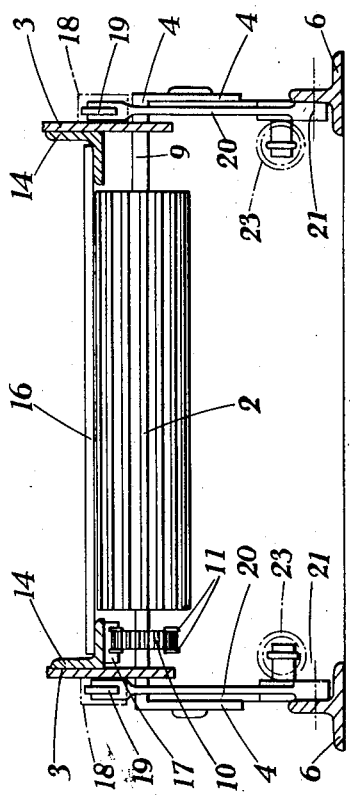

Other different characteristics of the invention will be referred to in the description which follows with reference to Figures 4 to 6 of the annexed drawings, which show one form of the invention comprising the above solution for the compensation of the weight of the carriage.

Figure 4A:
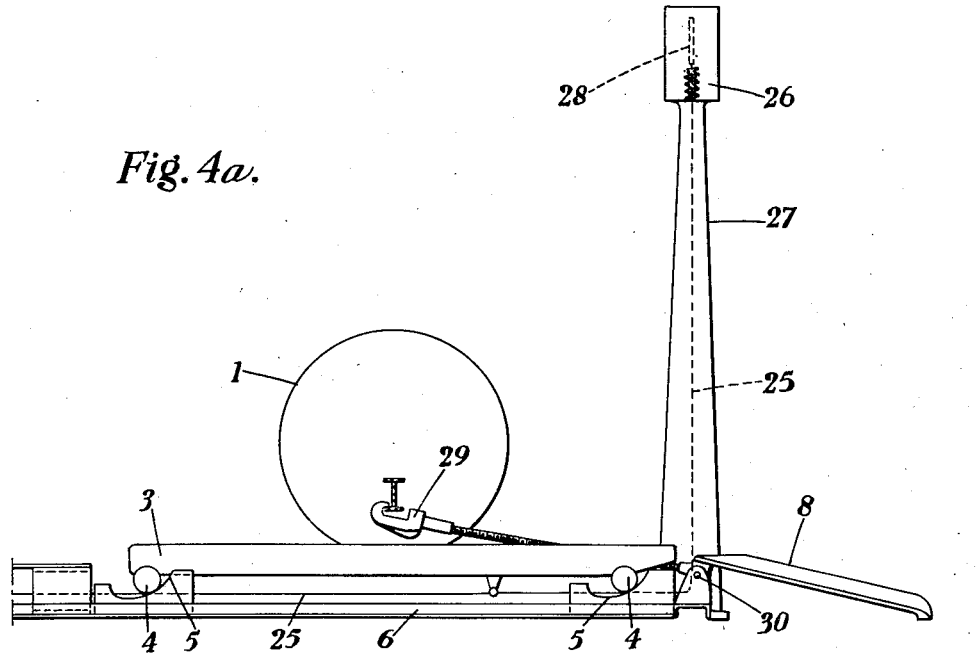

Fig. 4 is a longitudinal diagrammatic view of one end portion of the whole of the apparatus;

Fig. 4a is a longitudinal diagrammatic view of the other end portion of the apparatus;

Fig. 5 shows the carriage in detail; and

Fig. 6 is a transverse sectional view on the line 6—6 in Fig. 5.

As shown in the drawings, each wheel 1 of the vehicle whose brakes are to be tested rest on the channelled rollers 2 mounted between the cheeks 3 of a carriage, which is provided at its extremities with rollers 4 capable of running on curved ramps 5 integral with a frame 6 made from T irons.

There are thus four carriages aligned in pairs. Between two successive carriages a small platform 7, integral with the fixed frame, and a ramp 8, permitting access to each of the carriages, are provided.

On the shaft 9 of each roller or channeled cylinder a toothed wheel 10 is mounted, and all the wheels 10 are driven by a roller chain 11 which is actuated by a driving wheel 10ª mounted on the shaft of a speed reducer 12 coupled to a small electric motor 13, which is mounted on the carriage so that the system formed by the rollers and their drive are displaced as a whole with the carriage.

On each of the two cheeks 3 of each carriage a continuous angle iron 14 is fixed and these two angle irons 14 carry at each end a small platform 15, 16 at the level of the channeled rollers, which complete the arrangement and allow the vehicle to be positioned on the apparatus.

Under each of the angle irons 14, which overhang the chain transmission, are fixed shoes 17 whose lower faces are convex and which force the chain 11 to curve inwards between two successive wheels, in such a manner that the said chain cannot "jump". As the chain is of the roller type, it will be understood that no detrimental friction can result from this arrangement.

Each of the cheeks 3 of each carriage carries at its exterior a flat stop 18 against which is arranged a roller 19 mounted at the extremity of the arm 20 of a lever pivoted at 21 on an axle carried by the fixed frame 6. This lever is provided with another arm 22, perpendicular to the preceding, on which a spring 23 attached at a fixed point 24 on the frame 6, acts. When at rest, the arm 22 and the spring are directed along a horizontal line passing through the axis 21 so that the action of the spring on the carriage is nil. The weight of the carriage being equal to $\omega$, the weight which each spring must compensate is equal to $$\frac{\omega}{2}.$$

Each of the two springs of each carriage is thus given an initial tension equal to $$\frac{\omega}{2}\times\frac{\rho}{r}$$

$\rho$ being the length of the arm 20 equal to the radius of the ramps 5, and $r$ the length of the arm 22. At the side of its attachment 24 each spring comprises a usual screw adjustment in order to permit of the regulation of the spring tension.

As in said application No. 473,670, at any point of each carriage, by a cable 25, which leads to a box 26 mounted on a column 27, an index 28, pulled down by a spring at the end of said cable is displaceable in front of suitable graduations.

When the vehicle has been mounted on the four carriages of the apparatus, the wheels resting on the channelled rollers 2, one of the axles is connected by a hook 29, to a fixed point 30 of the frame.

The brakes either of two wheels of the same train, front or rear, or the four wheels simultaneously, are locked. The motors of the carriages of the locked wheels are then started. The said wheels begin to turn and the carriages advance along the ramps 5, thus allowing the index to be raised in the box 26. At the moment when one of the carriages advances, the lever 20—22 can oscillate and the spring 23 acts on the carriage in the same direction as the reaction of the wheel, so that when the carriage is stopped, equilibrium being attained, the corresponding index effectively marks the braking coefficient K, by virtue of the action explained above.

An examination of the plate 26 thus gives all the elements necessary to carry out the adjustment of the brakes in any desired conditions.

I claim:

1. In an apparatus for testing the brakes of a vehicle, the combination of a base, a series of curved ramps mounted on said base, a freely movable carriage for each vehicle wheel independently positioned on said ramps, continuously rotating rollers on said carriages in contact with said vehicle wheel, means for maintaining said vehicle stationary, and means for compensating the weight of said carriages on said ramps.

2. In an apparatus for testing the brakes of a vehicle, the combination of a freely movable carriage for each vehicle wheel positioned on rigid, curved ramps, a plurality of closely disposed continuously rotating rollers on said carriages forming horizontal seating surfaces in contact with said vehicle wheels, means for maintaining said vehicle stationary, and means for indicating the maximum slope on which the vehicle could be held by its brakes as determined by the ascension of the carriages on said ramps.

3. In an apparatus for testing the brakes of a vehicle, the combination of a freely movable carriage for each vehicle wheel positioned on rigid, curved ramps, continuously rotating rollers on said carriages in contact with said vehicle wheels, means for maintaining said vehicle stationary, means for compensating the weight of said carriages on said ramps, and means for indicating the maximum slope on which the vehicle could be held by its brakes as determined by the ascension of the carriages on said ramps.

4. In an apparatus for testing the brakes of a vehicle, the combination of a freely movable carriage for each vehicle wheel, positioned on rigid, curved ramps, a plurality of horizontally positioned rollers on said carriages for contact with said vehicle wheels, toothed wheels integral with said rollers, a motor mounted on each of said carriages, a common chain connecting said motor with said toothed wheels for rotating said rollers, means for maintaining said vehicle stationary, and means for indicating the maximum slope on which the vehicle could be held by its brakes as determined by the ascension of the carriages on said ramps.

5. In apparatus for testing brakes of vehicles, a frame having a plurality of curved ramps, a carriage for each vehicle wheel having wheels to run on said ramps, each carriage having a plurality of rotatable rollers upon which the vehicle wheels are carried during testing, means for rotating said rollers, whereby the carriages ascend the ramps according to the braking force of their corresponding wheels, means for indicating the braking effect of each wheel as determined by the ascension of its carriage, means for compensating the weight of each carriage, said means comprising a lever for each carriage each pivotally attached to the frame at one end and at their other ends abutting their carriages, and means for exerting a force opposing the influence of gravity on the carriages equal to said gravity influence.

EMILE PIQUEREZ.